(12) United States Patent
Manurangsi et al.

(10) Patent No.: US 12,468,838 B2
(45) Date of Patent: Nov. 11, 2025

(54) ADAPTIVE PRIVACY-PRESERVING INFORMATION RETRIEVAL

(71) Applicant: Google LLC, Mountain View, CA (US)

(72) Inventors: Pasin Manurangsi, Bangkok (TH); Shanmugasundaram Ravikumar, Piedmont, CA (US); Badih Ghazi, Bangkok (TH); Matthew Tran Clegg, Los Angeles, CA (US); Joseph Sean Cahill Goodknight Knightbrook, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/926,281

(22) PCT Filed: Aug. 23, 2022

(86) PCT No.: PCT/US2022/041165
§ 371 (c)(1),
(2) Date: Nov. 18, 2022

(87) PCT Pub. No.: WO2024/015085
PCT Pub. Date: Jan. 18, 2024

(65) Prior Publication Data
US 2025/0139282 A1     May 1, 2025

Related U.S. Application Data

(60) Provisional application No. 63/389,425, filed on Jul. 15, 2022.

(51) Int. Cl.
*G06F 21/62* (2013.01)
(52) U.S. Cl.
CPC .............................. *G06F 21/6245* (2013.01)

(58) Field of Classification Search
CPC . G06F 21/6245; G06F 21/6254; G06F 16/245
See application file for complete search history.

(56) References Cited

U.S. PATENT DOCUMENTS

| 7,698,250 B2 | 4/2010 | Dwork et al. |
| 8,619,984 B2 | 12/2013 | McSherry et al. |

(Continued)

FOREIGN PATENT DOCUMENTS

| CN | 109726758 | 1/2021 |
| CN | 112487472 | 3/2021 |

(Continued)

OTHER PUBLICATIONS

International Search Report and Written Opinion in International Appln. No. PCT/US2022/041165, mailed on Mar. 16, 2023, 11 pages.

(Continued)

*Primary Examiner* — Mohamed A. Wasel
(74) *Attorney, Agent, or Firm* — Fish & Richardson P.C.

(57) ABSTRACT

Methods, systems, and apparatus, including medium-encoded computer program products, for adaptive privacy-preserving information retrieval. An information server can accept from a user a request for privacy sensitive information accessible to the information server. The information server can determine a remaining privacy allocation for the user of the information server and can determine a noise parameter for a response to the request, where application of the noise parameter to the response can decrease a privacy loss associated with the response. The information server can determine a privacy modifier for the response. In response to the information server determining that the remaining privacy allocation satisfies the privacy modifier, the information server can: (i) determining the response to the request; (ii) apply the noise parameter to the response to produce a noised response; (iii) provide the noised response (Continued)

to the user; and (iv) adjust the remaining privacy allocation according to the privacy modifier.

19 Claims, 3 Drawing Sheets

(56) References Cited

U.S. PATENT DOCUMENTS

| | | | |
|---|---|---|---|
| 10,108,818 | B2 | 10/2018 | Curcio et al. |
| 10,192,069 | B2 | 1/2019 | Nerurkar et al. |
| 10,380,366 | B2 | 8/2019 | Bernau et al. |
| 10,540,521 | B2* | 1/2020 | Baracaldo Angel ........................ G10L 21/0208 |
| 10,586,068 | B2 | 3/2020 | Nerurkar et al. |
| 10,642,847 | B1* | 5/2020 | Nerurkar ............ G06F 16/2462 |
| 11,055,432 | B2 | 7/2021 | Hockenbrocht et al. |
| 2010/0146586 | A1* | 6/2010 | Cho ........................ G06Q 10/00 726/1 |
| 2011/0208763 | A1 | 8/2011 | McSherry et al. |
| 2014/0344944 | A1* | 11/2014 | Olumofin ................ H04L 9/008 726/26 |
| 2015/0089576 | A1* | 3/2015 | Poroor .................... H04L 63/20 726/1 |
| 2015/0161398 | A1* | 6/2015 | De Cristofaro ........ G06Q 10/10 726/26 |
| 2017/0142158 | A1* | 5/2017 | Laoutaris .............. H04W 12/02 |
| 2019/0227980 | A1 | 7/2019 | McMahan et al. |
| 2020/0250335 | A1 | 8/2020 | Hockenbrocht et al. |
| 2020/0327252 | A1 | 10/2020 | McFall et al. |
| 2022/0138348 | A1* | 5/2022 | Bernau .................. G06N 20/00 726/26 |
| 2022/0382904 | A1* | 12/2022 | Cheung ................. H04L 9/3247 |
| 2023/0047092 | A1* | 2/2023 | Marathe ............. G06F 21/6245 |

FOREIGN PATENT DOCUMENTS

| | | |
|---|---|---|
| CN | 108197492 | 6/2021 |
| CN | 113268772 | 8/2021 |
| CN | 108537055 | 4/2022 |
| CN | 114462090 | 5/2022 |

OTHER PUBLICATIONS

Bun et al., "Concentrated Differential Privacy: Simplifications, Extensions, and Lower Bounds" TCC (B1) 2016: 635-658.
Canonne et al., "The discrete gaussian for differential privacy." Advances in Neural Information Processing Systems 33, 2020, 13 pages.
Dwork et al., "Concentrated Differential Privacy" submitted on Mar. 2016, arXiv: 1603.01887, 28 pages.
Feldman et al., "Individual Privacy Accounting via a Renyi Filter" submitted on Aug. 2020, arXiv: 2008.11193, 22 pages.
Github.com [online], "WFA—World Federation of Advertisers" Sep. 2020, retrieved on Jan. 26, 2023, retrieved from URL <https://github.com/world-federation-of-advertisers>, 3 pages.
Kairouz et al., "The Distributed Discrete Gaussian Mechanism for Federated Learning with Secure Aggregation" International Conference on Machine Learning, PMLR, Jul. 2021, 12 pages.
Lécuyer, "Practical Privacy Filters and Odometers with Rényi Differential Privacy and Applications to Differentially Private Deep Learning" submitted on Jun. 2021, arXiv: 2103.01379, 9 pages.
Mironov, "Rényi Differential Privacy" submitted on Aug. 2017, arXiv: 1702.07476, 13 pages.
Rogers et al., "Privacy odometers and filters: Pay-as-you-go composition." Advances in Neural Information Processing Systems 2, 2016, 9 pages.
International Preliminary Report on Patentability in International Appln. No. PCT/US2022/041165, mailed on Jan. 30, 2025, 6 pages.

* cited by examiner

ADAPTIVE PRIVACY-PRESERVING INFORMATION RETRIEVAL

CROSS-REFERENCE TO RELATED APPLICATION

This application is a National Stage Application under 35 U.S.C. § 371 and claims the benefit of International Application No. PCT/US2022/041165, filed Aug. 23, 2022, which claims priority to U.S. Application No. 63/389,425, filed Jul. 15, 2022, the disclosure of which is incorporated herein by reference.

BACKGROUND

This specification relates to adaptive privacy-preserving information retrieval, and more specifically to using a truncated discrete Gaussian distribution and concentrated differential privacy for efficient and privacy-preserving information retrieval.

Differential privacy (DP) is a system for publicly sharing information about a dataset by describing the patterns of groups within the dataset while withholding information about individuals in the dataset. A system is DP if by looking at the results of queries against the dataset, one cannot tell whether or not any individual's data was included in the original dataset.

SUMMARY

This specification describes technologies relating to the retrieval of aggregate data relating to privacy-protected information. Privacy-protected information can include any representation of information that permits the identity of an individual to whom the information applies to be determined. Such a determination can be made directly from the contents of the information or indirectly through the analysis of one or more pieces of information retrieved in one query or in multiple queries.

Particular embodiments of the subject matter described in this specification can be implemented so as to realize one or more of the following advantages. The techniques described below can be used to provide summarized data relating to private information while limiting the privacy exposure of users to which the underlying data relates. In addition, the techniques enable researchers to obtain a maximum amount of summarized information while limiting the exposure of private data. Further, the techniques permit researchers to specify the portion of their limited privacy allocation that they are willing to use for individual queries, or for groups of queries.

One aspect features accepting, by an information server and from a user, a request for privacy sensitive information accessible to the information server. The information server can determine a remaining privacy allocation for the user of the information server and can determine a noise parameter for a response to the request, where application of the noise parameter to the response can decrease a privacy loss associated with the response. The information server can determine a privacy modifier for the response. In response to the information server determining that the remaining privacy allocation satisfies the privacy modifier, the information server can: (i) determine the response to the request; (ii) apply the noise parameter to the response to produce a noised response; (iii) provide the noised response to the user; and (iv) adjust the remaining privacy allocation according to the privacy modifier.

One or more of the following features can be included. In response to the information server determining that the remaining privacy allocation does not satisfy the privacy modifier, the information server can provide an error response to the user. In response to the information server determining that the remaining privacy allocation does not satisfy the privacy modifier, the information server can determine a second noise parameter, where the second noise parameter decreases the privacy modifier of the response. The request can include a request allocation that indicates a maximum privacy modifier for the response. The noise parameter can be determined at least in part based on the request allocation included in the request. The request can include one or more parameters of a truncated discrete Gaussian distribution. The noise parameter can be determined in accordance with the truncated discrete Gaussian distribution. The privacy modifier can be determined, at least in part, based on the parameters of the truncated discrete Gaussian distribution. The noise parameter can be determined, at least in part, using a truncated discrete Gaussian distribution. The noise parameter can be determined at least in part based on the remaining privacy allocation.

The details of one or more embodiments of the subject matter described in this specification are set forth in the accompanying drawings and the description below. Other features, aspects, and advantages of the invention will become apparent from the description, the drawings, and the claims.

DETAILED DESCRIPTION

Figure 1:
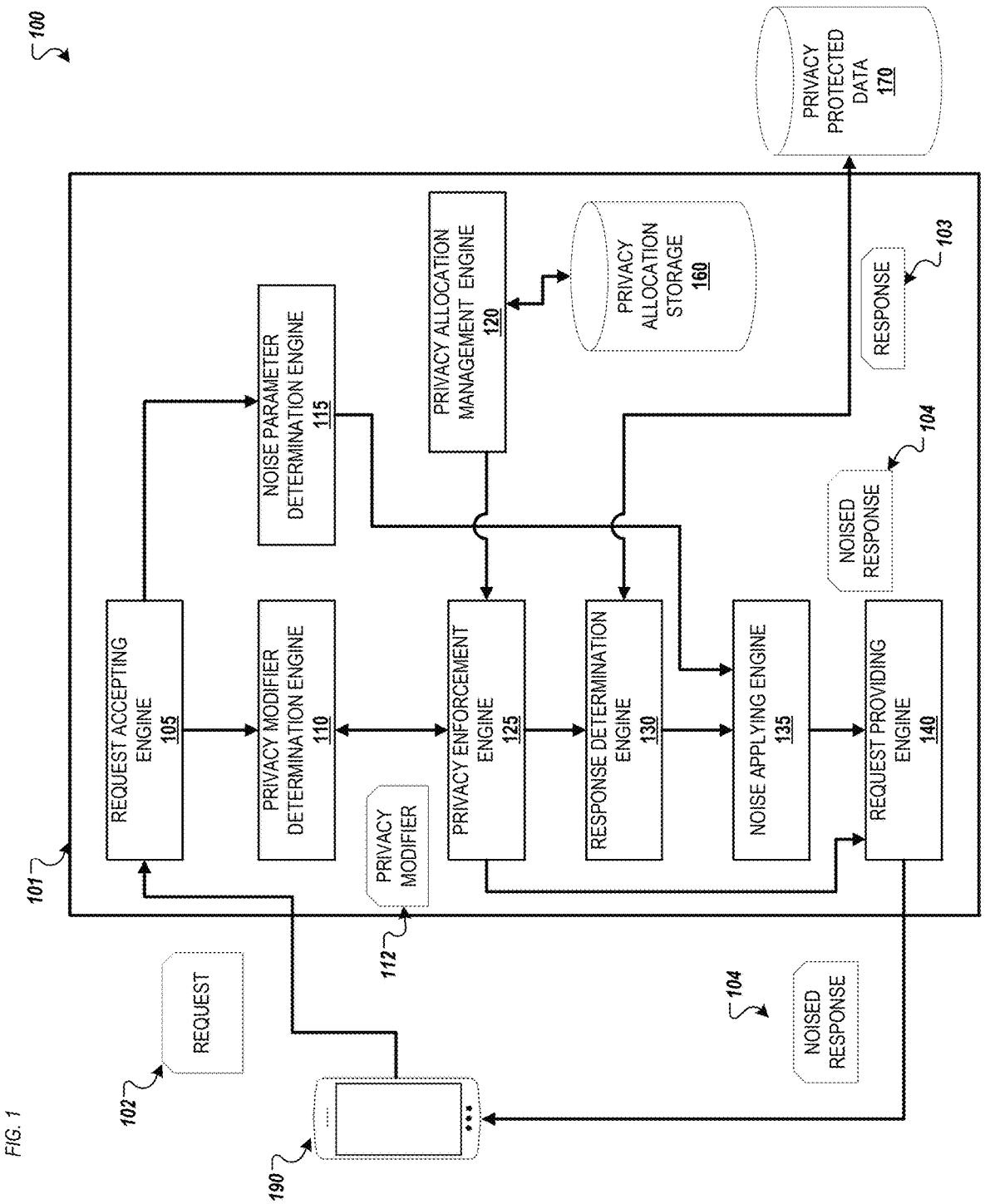
FIG. 1 shows an example of an environment for adaptive privacy-preserving information retrieval.

Aggregated information can be used to guide important decisions. For example, aggregated data relating to medical procedures and/or treatments can be used to shape treatment recommendations for a wide variety of conditions. Similarly, aggregated data obtained during medical trials can provide information regarding efficacy and side effects, which can lead to better outcomes. In business, knowledge about behaviors can enable businesses to provide products and services that meet client needs and expectations.

However, while results that contain large data aggregations can create little risk to privacy, queries for subsets of the information disaggregate the data and can increase the likelihood that knowledge about particular individuals can be inferred. For example, an aggregated data set from the United States is likely sufficiently large that conclusions about any particular person are unlikely. Similarly, a subset of the data for California is also likely to be large. However, a query for a town in California with a small population can greatly increase the risk of personal data leakage.

One approach to protecting privacy is to add a random or pseudo-random noise parameter to the results of a query and to provide the "noised data" to the requestor, which can alleviate some privacy concerns. However, with a sufficiently large number of queries, a motivated requestor can determine and correct for the noise parameter, creating a potential risk to privacy.

Another approach to protecting privacy is to limit the number of queries any given requestor can make, imposing a "privacy allocation" intended to protect privacy. For example, each requestor can be limited to a set number of queries against any given dataset, and the limit can be established to ensure a sufficient level of privacy is maintained.

However, depending on the actual queries involved, and techniques used to produce results, such hard limits can overly constrain a researcher's work, thereby limiting the effectiveness of the research. As described above, adding noise to results can limit privacy impact, and the impact on privacy of a query can depend on the distribution from which the noise is selected. For example, results adjusted by noise drawn from a broader distribution can reduce privacy impact. Since researchers can often tolerate more noise applied to some responses than to others, using noise parameters drawn from a static distribution can overly constrain the number of queries permitted, and therefore, the effectiveness of research. Similarly, applying too much noise to particular queries can constrain research as the data provided can become unrepresentative.

To address these limitations, this specification describes techniques for adaptive privacy-preserving information retrieval. The techniques can include a privacy allocation, but rather than reducing the remaining allocation by a fixed amount per query, an allocation impact can be determined adaptively for each query, and can include factors relating to the noise parameters applied to the query, as described further below. The adaptive techniques can increase the amount of information provided to users while preserving strong privacy.

FIG. 1 shows an example of an environment 100 for adaptive privacy-preserving information retrieval. The environment 100 can include a system 101 for adaptive privacy-preserving information retrieval, user devices 190, and privacy protected data 170 residing on one or more storage systems.

Privacy protected data 170 can be any type of data stored in any form. Privacy protected data 170 can be, among other examples, in the form of text data, audio data, video data, and can be any combination of forms. Privacy protected data 170 can be stored in any suitable storage system, or combinations of storage systems, such as structured databases, unstructured databases, file systems, block storage, etc. Privacy protected data 170 can be structured data, unstructured data, or combinations of structured and unstructured data. Privacy protected data 170 can also include metadata, which can include, among many other examples, the creator of the data, the owner of the data, access permissions, date of creation, date of last modification.

The system 101 can include a request accepting engine 105, a privacy modifier determination engine 110, a noise parameter determination engine 115, a privacy allocation management engine 120, a privacy enforcement engine 125, privacy allocation storage 160, a response determination engine 130, a noise applying engine 135 and a request providing engine 140.

The request accepting engine 105 can accept requests 102 from user devices 190. The request accepting engine 105 can accept requests 102 using any suitable technique. For example, the request accepting engine 105 can accept a HyperText Transport Protocol (HTTP) message that contains the request 102. In another example, the system can provide an Application Programming Interface (API) which, when called by a user, enables the user to provide a request 102 to the request accepting engine 105. The request accepting engine 105 can provide the request 102, or components of the request 102, to other elements of the system 101, including the privacy modification determination engine 110 and to the noise parameter determination engine 115.

The request 102 can include a specification of information desired by a user, and the specification can be in any suitable format. For example, the specification can be Structured Query Language (SQL) query. In another example, the specification can be a Boolean query. In still another example, the specification can include a token indicating a predefined query (e.g., "query 1" indicates a request related to birth rate) and can optionally include additional parameters (e.g., data relating to Los Angeles). The request 102 can include specifications of multiple sets of requested information. For example, the request 102 can include an indication that information is requested for multiple summary data items, such as information relating to the birth rate in Los Angeles and information relating to the birth rate in San Francisco.

Figure 2:
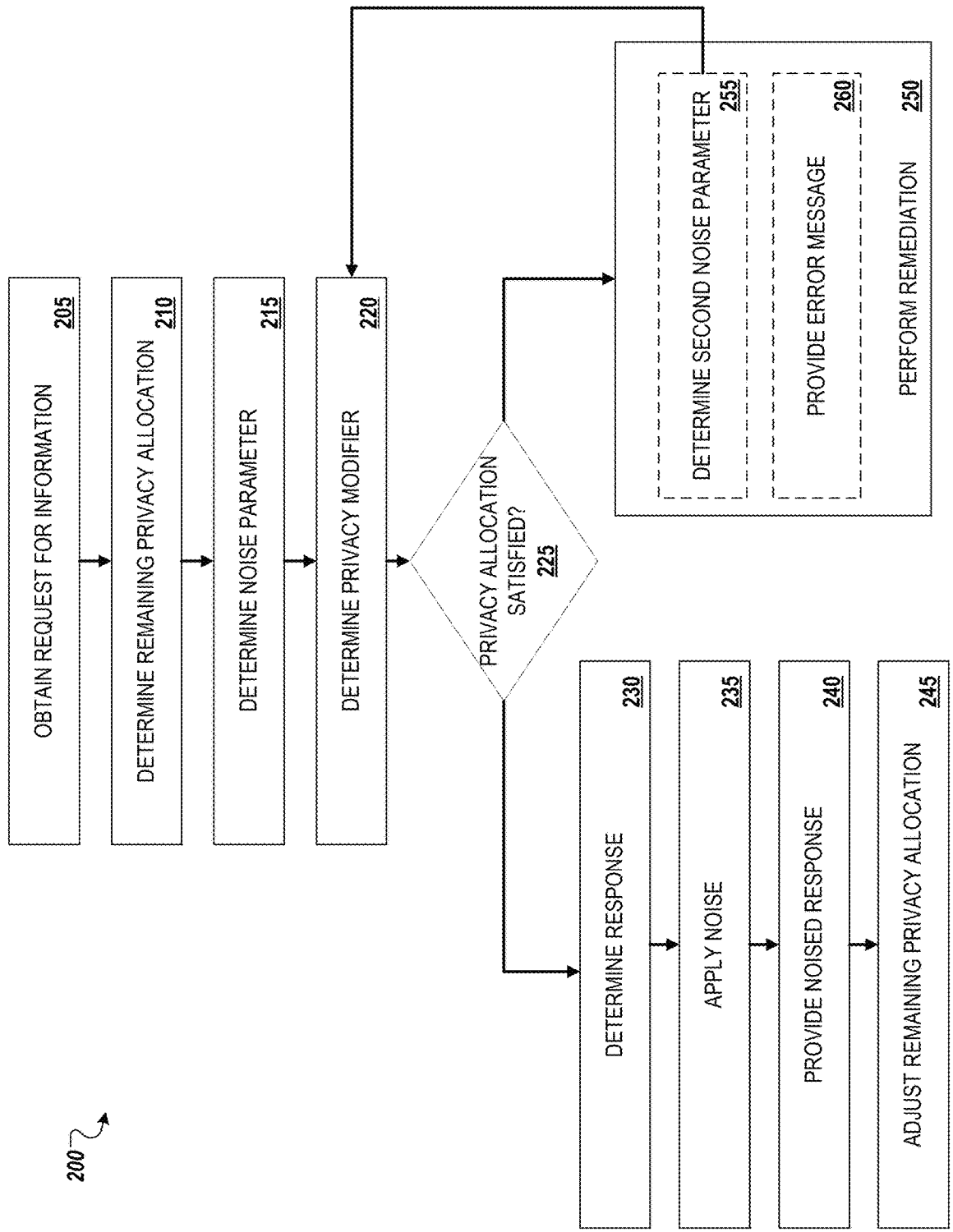
FIG. 2 is a flow diagram of an example process for adaptive privacy-preserving information retrieval.

The request 102 can further include metadata, which can include information describing a privacy modifier for the requested information and/or information relating to the noise parameter, as described further in reference to FIG. 2. Metadata can further include one or more of: an indication of the requestor, an indication of the requestor's organization, the urgency of the request, the time of the request, among numerous other examples.

The privacy modifier determination engine 110 can accept a request 102 (in whole or in part) from the request accepting engine 105, and can determine a privacy modifier 112, which can express the amount of a privacy allocation to be expended in response to a request 102. The privacy modifier 112 can be expressed in various forms, including one or more numeric values, such as values for $\rho$ and $\theta$, as described further in reference to FIG. 2.

The noise parameter determination engine 115 can accept a request 102 (in whole or in part) from the request accepting engine 105, and can determine a noise parameter to be applied to a response 103, which will result in creating a noised response 104. The noise parameter can be one or more values, which can be integers, real numbers or other values appropriate for applying noise to results. Noise parameters can be drawn randomly or pseudo-randomly from a statistical distribution, such as a truncated discrete Gaussian distribution. Parameters that define the statistical distribution can be included in the request 102 and/or can be determined based on privacy-related information (e.g., privacy modifiers) included in the request 102. The noise parameter determination engine 115 can provide the noise parameters to the noise applying engine 135.

The privacy allocation management engine 120 can store and provide privacy allocations associated with requests 102. The privacy allocation management engine 120 can store privacy allocations in the privacy allocation storage system 160, which can be any suitable form of storage system, such as a database or a file system, and can retrieve privacy allocations from the privacy allocation storage 160. Note that while the privacy allocation storage system 160 is illustrated as being within the system 101, the privacy allocation storage system 160 can also be physically separate from the system 101, and accessed remotely, e.g., over a network such as an intranet or the Internet.

Privacy allocations can be expressed in various forms, including forms used for privacy modifiers 112, such as $\rho$ and $\theta$. Other numeric and non-numeric forms can be used to express privacy allocations. Privacy allocations can be associated with individual requestors and/or to one or more groupings of requestors, such as organizations or affiliations to which requestors belong. The system can maintain a list that includes, for all users, or for a subset of users, the groupings to which the user(s) belong. Such a list can allow privacy allocations for a group to be adjusted when a member of the group issues a query, as described further below. The list can be provided to the system as a configuration parameter.

The privacy enforcement engine 125 accepts privacy allocations from the privacy allocation management engine 120 and privacy modifiers 112 from the privacy modifier determination engine 110 and determines whether the privacy modifiers 112 satisfy the privacy allocation. If the privacy enforcement engine 125 determines that the privacy modifiers 112 does not satisfy the privacy allocation, the privacy enforcement engine 125 can provide an indication that privacy enforcement failed to other system 101 components, such as the request providing engine 140 and the privacy modifier determination engine 110. In response, the privacy modifier determination engine 110 can determine an alternate privacy modifier 112, as described further below. If the privacy enforcement engine 125 determines that the privacy modifier 112 satisfies the privacy allocation, the privacy enforcement engine 125 can send an indication to the response determination engine 130.

The response determination engine 130 can use the specification of information desired by a user included in the request 102 to retrieve information from privacy protected data storage systems 170. The response determination engine 130 can use any suitable information retrieval technique to obtain the response 103, which can contain responsive privacy protected data. For example, the response determination engine 130 can provide SQL queries to a relational database. The response 103 can include one more numeric or non-numerical values that are pertinent to the request 102. The response can further include various metadata elements, such as the source of the information, the owner of the information, access privileges, and so on.

The noise applying engine 135 can apply the noise parameter provided by the noise parameter determination engine 115 to the response 103 to create a noised response 104, as described further in reference to FIG. 2.

The request providing engine 140 can provide to the user device 190 the noised response 104 or an indication that a noised response cannot be provided, e.g., because the privacy modifier 112 does not satisfy the privacy allocation answer as determined by the privacy enforcement engine 125. The request providing engine 140 can provide such information to the user device 190 using any appropriate protocol. For example, the request providing engine 140 can include the information in an HTTP response or in a response to an API call made by the user device 190.

The user device 190 can be an electronic device that is capable of performing computing and communicating over the network. Example user devices 190 can include personal computers, mobile communication devices, e.g., smart phones and tablets. A user device 190 can include a display that can be a touch screen display capable of detecting user interactions such as "taps" and "swipes." The user device 190 can include other input and output mechanisms and/or peripheral devices.

FIG. 2 is a flow diagram of an example process for adaptive privacy-preserving information retrieval. For convenience, the process 200 will be described as being performed by a system for privacy-preserving information retrieval system, e.g., the privacy-preserving information retrieval system 101 of FIG. 1, appropriately programmed to perform the process. Operations of the process 200 can also be implemented as instructions stored on one or more computer readable media which may be transitory or non-transitory, and execution of the instructions by one or more data processing apparatus can cause the one or more data processing apparatus to perform the operations of the process 200. One or more other components described herein can perform the operations of the process 200.

The system obtains (205) from the user a request for content stored on the server. The request can be received over a network, for example, by receiving an HTTP message that contains the user requests. In another example, the system can provide an API which, when called by a user, enables the user to specify a request. The request can contain an indication of the information requested, and metadata such as the requestor, as described in reference to FIG. 1.

In some implementations, the request can include a request allocation that specifies the maximum privacy allocation that the user is willing to expend to receive aggregated data as a response to the request. The specification of the request allocation can take various forms. For example, the request allocation can include values of $\rho$ and $\theta$. In another example, the request allocation can include a token (e.g., "hi," "medium" or "low"), and the system can determine values for $\rho$ and $\theta$ using a configured mapping of each token to a specific value of $\rho$ and $\theta$. Exemplary values for $\rho$ can be in the range $10^{-6}$ to $5 \times 10^{-4}$, and an exemplary value of $\theta$ can be $e^{-15}$. Other values of $\rho$ and $\theta$ can also be used.

In yet another example, the request can include a token that indicates the portion of the remaining allocation the user is willing to exhaust to perform the query. Tokens such as "all," "hi," "medium" and "low" can indicate, as just one example, that the user is willing to use 100%, 80%, 40% and 10%, respectively, of the remaining privacy allocation on the query, and the system can determine corresponding values of $\rho$ and $\theta$ by multiplying $\rho$ and $\theta$, determined in operation 210, by the percentage. Relatedly, the request can include the actual percentage of the remaining allocation that the user is willing to expend.

In some implementations, the request can specify parameters $\mu$ and $\sigma$ that define a truncated discrete Gaussian distribution from which noise parameters are defined. The system can determine $\rho$ and $\theta$ from $\mu$ and $\sigma$, as described further below.

In some implementations, the request can include multiple sub-requests, as described above. In such cases, the determination of the request allocation can apply to all sub-requests within the requests.

The system determines (210) a remaining privacy allocation for a user of the system. A privacy allocation can be specified using various techniques. For example, the privacy allocation can be specified by parameters $\rho$ and $\theta$. Initially, the remaining privacy allocation can be specified as configured values of $\rho$ and $\theta$, and the remaining privacy allocation can be adjusted, for example, as described in reference to operation 240.

The system can determine the remaining privacy allocation for a user by retrieving the user's privacy allocation from privacy allocation storage. As described above, the user can be identified in the request, and the system can use the identified user to determine the remaining privacy allocation, e.g., by querying privacy allocation storage for the privacy allocation for the identified user.

In some implementations, the system can determine the remaining privacy allocation for a group of users by retrieving the group's privacy allocation from privacy allocation storage. As described above, privacy allocations can be associated with individual requestors and/or to one or more groupings of requestors, such as organizations or affiliations to which requestors belong. As further described above, the user can be identified in the request, and the system can use the identified user and the list of groups and their affiliated users to determine the group or groups with which the user is associated, and determine the remaining privacy allocations for each such group. In some implementations, the system can use the minimum privacy allocation of the privacy allocations of the groups as the remaining privacy allocation. Such an approach further prevents data acquired by multiple users of a single group from being collated, thereby circumventing privacy restrictions.

The system determines (215) a noise parameter for a response to the request. As described above, application of the noise parameter to the response decreases a privacy loss associated with the response. The noise parameter can include one or more values drawn randomly or pseudo-randomly from a truncated discrete Gaussian distribution parameterized by μ and σ. (In a truncated discrete Gaussian distribution, the probability mass at an integer x is proportional to $$e\left(\frac{-(x-\mu)^2}{2\sigma^2}\right),$$

and noise can range from 0 to 2μ.)

The system can use various techniques to determine μ and σ. In implementations in which the request includes μ and σ, the system can use the values in the request.

In implementations in which the request includes ρ and θ, the system can use those values to determine μ and σ. The system can determine the smallest σ such that $0.5\varepsilon'^2 \leq \rho$, where:

$$\varepsilon' = \min\left\{\sqrt{\varepsilon^2 + 5\zeta}, \varepsilon + 10\zeta\right\} \qquad (1)$$

$$\zeta = \sum_{i=1}^{w-1} e^{-(2\pi^2\sigma^2)\left(\frac{i}{i+1}\right)} \qquad (2)$$

$$\varepsilon = 1/\sigma\sqrt{w} \qquad (3)$$

In addition, μ can be computed as shown in Equation 4:

$$\mu = \sigma * \sqrt{2\ln\left(\frac{w}{\theta}\right)} \qquad (4)$$

The parameter w can indicate the number of parties adding noise to queries, and can be a configured value. In some cases, the value will range from two to ten, although other values can be used.

The system determines (220) the privacy modifier for the response according to the noise parameter. The privacy modifier, which can be expressed in terms of θ and ρ, can be determined using various techniques. If the request includes values for θ and ρ, including values provided indirectly (e.g., by specifying a token such as "hi," "medium" or "low"), the system can use the values provided in the request.

If the request does not include θ and ρ, and does include μ and σ, θ and ρ can be determined from μ and σ, as shown in Equations 5 and 6 below, where ε' is computed according to Equations 1, 2 and 3.

$$\theta = w\left(e^{-\mu^2/2\sigma^2}\right) \qquad (5)$$

$$\rho = 0.5\varepsilon'^2 \qquad (6)$$

The system determines (225) whether the remaining privacy allocation satisfies the privacy modifier for the response. The system can determine whether the remaining privacy allocation satisfies the privacy modifier by comparing the value of the remaining privacy allocation to the privacy modifier. In some implementations, the system can compare the computed values of θ and ρ to the values of θ and ρ in the remaining privacy allocation, and use the comparison to determine whether the modifier of the response exceeds the privacy allocation. The remaining privacy allocation can satisfy the privacy modifier if the privacy modifier is no larger than the remaining privacy allocation. If the remaining privacy allocation satisfies the privacy modifier, the system proceeds to operation 230; if the remaining privacy allocation does not satisfy the privacy modifier, the system proceeds to operation 250.

In response to determining that the remaining privacy allocation satisfies the privacy modifier, the system determines (230) the response. The system can determine the response using any suitable information retrieval technique. For example, the system can provide the user request to an information storage system (e.g., by making a query against a relational database or an unstructured database), and receive a response from the information storage system. As described above, the response can include one or more values.

The system applies (235) the noise parameter. For each value in the response, the system can apply the corresponding noise value stored in the noise parameter as determined in operation 215, for example, by adding the noise value to the response value to produce a noised response value. When multiple response values exist, the system can apply the first noise value in the noise parameter to the first value in the response, the second noise value in the noise parameter to the second value in the response, and so on. In another example, the system can select a noise value from the noise parameter randomly for each value in the response. The system can create the noised response by aggregating the noised response values.

The system adjusts (240) the remaining privacy allocation according to the determined privacy modifier. The system can adjust the values of θ and ρ in the remaining by the values of θ and ρ determined in operation 220. Such an adjustment can include subtracting θ and ρ determined in operation 220 from the values of θ and ρ in the remaining privacy allocation. The system can store the remaining privacy allocation in privacy allocation storage. As described above, in various implementations, the system can adjust the remaining privacy allocation of a user, of a group or groups with which the user is affiliated, or both the user and group or groups.

The system provides (245) the response, which the system can provide using various techniques. The system can store the results in a file system, e.g. by using an API provided by the file system. The system can store the results in a database, for example by using SQL operations. The system can transmit the response to a user device using, for example, networking protocols such as Transmission Control Protocol/Internet Protocol (TCP/IP) and HTTP. Other techniques can be used.

In response to determining that the remaining privacy allocation does not satisfy the privacy modifier, the system can perform (250) remediation. In some implementations, the system can determine (255) a second noise parameter that decreases the privacy modifier of the response. In some implementations, the system can reduce θ and ρ. For example, the system can multiply θ and ρ by a scaling factor (e.g., 0.6, 0.7, 0.8, etc.). After the system determines the second noise parameter, the system can return to operation 220.

In some implementations, the system can provide (260) an error response. The system can provide the error response by transmitting an error value or error message to the user device or to an administrator. The system can provide the error response using various techniques such as by transmitting a message containing the error response over a networking protocol (such as TCP/IP or HTTP), by writing an error message or an error value to a log file or logging system, and/or using other suitable techniques for providing error responses.

Figure 3:
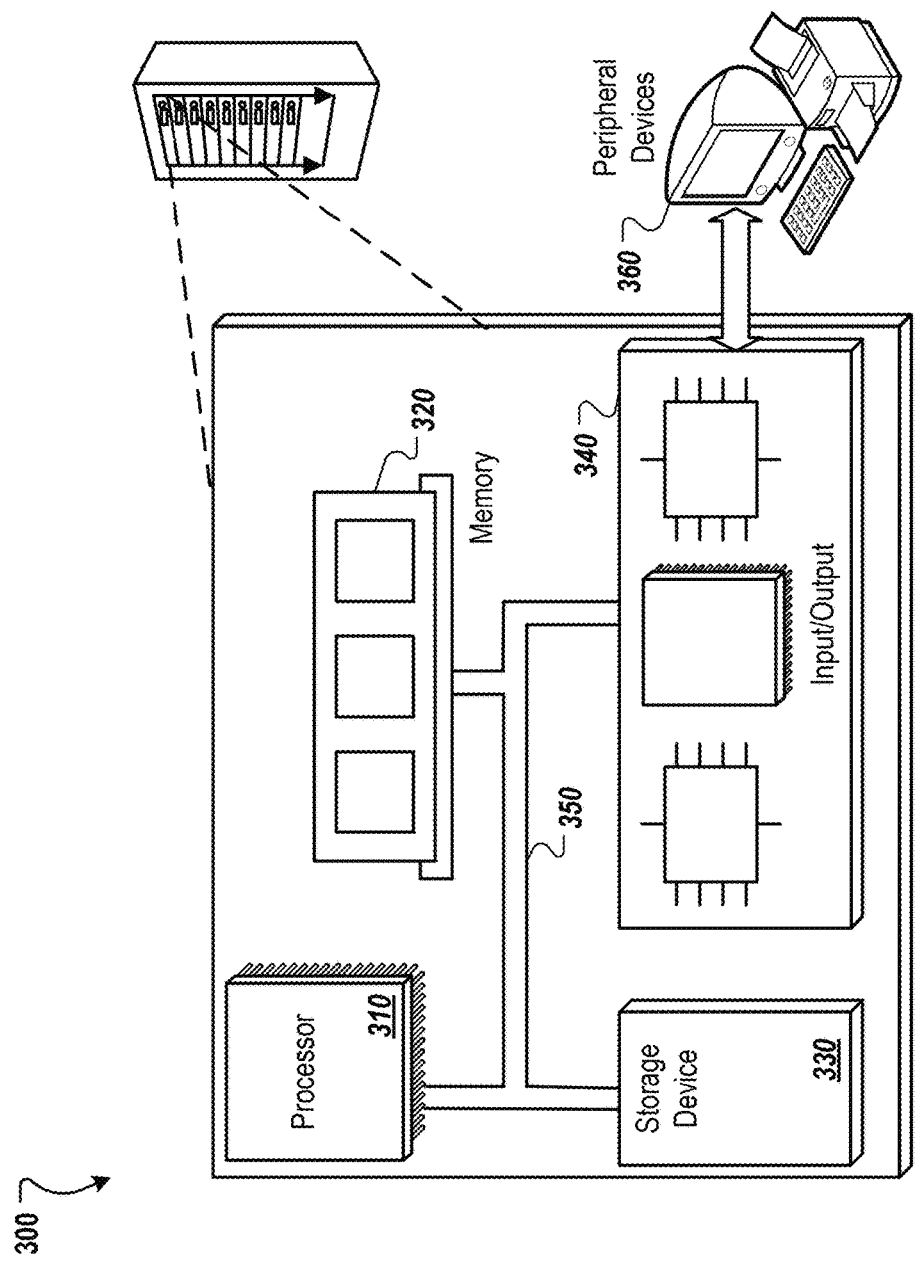
FIG. 3 is a block diagram of an example computer system.

FIG. 3 is a block diagram of an example computer system 300 that can be used to perform operations described above. The system 300 includes one or more processors 310, a memory 320, a storage device 330, and an input/output device 340. Each of the components 310, 320, 330, and 340 can be interconnected, for example, using a system bus 350. The processor 310 is capable of processing instructions for execution within the system 300. In one implementation, the one or more processors 310 may comprise a single-threaded processor. Additionally or alternatively, the one or more processors 310 may comprise a multi-threaded processor. The one or more processors 310 are capable of processing instructions stored in the memory 320 or on the storage device 330.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 can include, for example, a hard disk device, an optical disk device, a storage device that is shared over a network by multiple computing devices (e.g., a cloud storage device), or some other large capacity storage device.

The input/output device 340 provides input/output operations for the system 300. In one implementation, the input/output device 340 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 360. Other implementations, however, can also be used, such as mobile computing devices, mobile communication devices, set-top box television client devices, etc.

Although an example processing system has been described in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

To provide for interaction with a user, embodiments of the subject matter described in this specification can be implemented on a computing device capable of providing information to a user. The information can be provided to a user in any form of sensory format, including visual, auditory, tactile or a combination thereof. The computing device can be coupled to a display device, e.g., an LCD (liquid crystal display) display device, an OLED (organic light emitting diode) display device, another monitor, a head mounted display device, and the like, for displaying information to the user. The computing device can be coupled to an input device. The input device can include a touch screen, keyboard and a pointing device, e.g., a mouse or a trackball, by which the user can provide input to the computing device. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer implemented method comprising:
   accepting, by an information server and from a user, a request for privacy sensitive information accessible to the information server;
   determining, by the information server, a remaining privacy allocation for a user of the information server;
   determining, by the information server, a noise parameter for a response to the request, wherein application of the noise parameter to the response decreases a privacy loss associated with the response;
   determining, by the information server, a privacy modifier for the response; and
   in response to determining, by the information server, that the remaining privacy allocation satisfies the privacy modifier:
   determining the response to the request;
   applying the noise parameter to the response to produce a noised response;

providing the noised response to the user; and
adjusting the remaining privacy allocation according to the privacy modifier,
wherein the request includes one or more parameters of a truncated discrete Gaussian distribution with a nonzero mean.

2. The computer implemented method of claim 1, further comprising:
in response to determining, by the information server, that the remaining privacy allocation does not satisfy the privacy modifier, providing an error response to the user.

3. The computer implemented method of claim 1, further comprising:
in response to determining, by the information server, that the remaining privacy allocation does not satisfy the privacy modifier, determining a second noise parameter, wherein the second noise parameter decreases the privacy modifier of the response.

4. The computer implemented method of claim 1, wherein the request includes a request allocation that indicates a maximum privacy modifier for the response.

5. The computer implemented method of claim 4, wherein the noise parameter is determined at least in part based on the request allocation included in the request.

6. The computer implemented method of claim 1, wherein the noise parameter is determined in accordance with the truncated discrete Gaussian distribution.

7. The computer implemented method of claim 1, wherein the privacy modifier is determined, at least in part, based on the parameters of the truncated discrete Gaussian distribution.

8. The computer implemented method of claim 1, wherein the noise parameter is determined, at least in part, using a truncated discrete Gaussian distribution.

9. The computer implemented method of claim 1, wherein the noise parameter is determined at least in part based on the remaining privacy allocation.

10. A system comprising:
one or more computers; and
one or more storage devices storing instructions that, when executed by the one or more computers, cause the one or more computers to perform operations comprising:
accepting, from a user, a request for privacy sensitive information accessible to an information server;
determining a remaining privacy allocation for a user of the information server;
determining a noise parameter for a response to the request, wherein application of the noise parameter to the response decreases a privacy loss associated with the response;
determining a privacy modifier for the response; and
in response to determining, by the information server, that the remaining privacy allocation satisfies the privacy modifier:
determining the response to the request;
applying the noise parameter to the response to produce a noised response;
providing the noised response to the user; and
adjusting the remaining privacy allocation according to the privacy modifier,
wherein the request includes one or more parameters of a truncated discrete Gaussian distribution with a nonzero mean.

11. The system of claim 10, wherein the instructions cause the one or more computers to perform operations further comprising:
in response to determining that the remaining privacy allocation does not satisfy the privacy modifier, providing an error response to the user.

12. The system of claim 10, wherein the instructions cause the one or more computers to perform operations further comprising:
in response to determining that the remaining privacy allocation does not satisfy the privacy modifier, determining a second noise parameter, wherein the second noise parameter decreases the privacy modifier of the response.

13. The system of claim 10, wherein the request includes a request allocation that indicates a maximum privacy modifier for the response.

14. The system of claim 13, wherein the noise parameter is determined at least in part based on the request allocation included in the request.

15. One or more non-transitory computer readable medium storing instructions that, when executed by one or more data processing apparatus, cause the one or more data processing apparatus to perform operations comprising:
accepting, from a user, a request for privacy sensitive information accessible to an information server;
determining a remaining privacy allocation for a user of the information server;
determining a noise parameter for a response to the request, wherein application of the noise parameter to the response decreases a privacy loss associated with the response;
determining a privacy modifier for the response; and
in response to determining, by the information server, that the remaining privacy allocation satisfies the privacy modifier:
determining the response to the request;
applying the noise parameter to the response to produce a noised response;
providing the noised response to the user; and
adjusting the remaining privacy allocation according to the privacy modifier,
wherein the request includes one or more parameters of a truncated discrete Gaussian distribution with a nonzero mean.

16. The non-transitory computer readable medium of claim 15, wherein the instructions cause the one or more data processing apparatus to perform operations further comprising:
in response to determining that the remaining privacy allocation does not satisfy the privacy modifier, providing an error response to the user.

17. The non-transitory computer readable medium of claim 15, wherein the instructions cause the one or more data processing apparatus to perform operations further comprising:
in response to determining that the remaining privacy allocation does not satisfy the privacy modifier, determining a second noise parameter, wherein the second noise parameter decreases the privacy modifier of the response.

18. The non-transitory computer readable medium of claim 15, wherein the request includes a request allocation that indicates a maximum privacy modifier for the response.

19. The non-transitory computer readable medium of claim 18, wherein the noise parameter is determined at least in part based on the request allocation included in the request.

* * * * *